Figure 2:
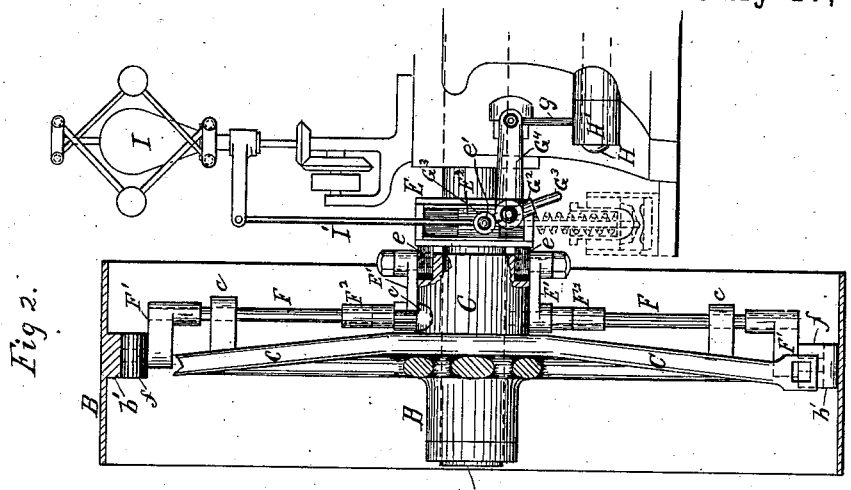

(No Model.) 5 Sheets—Sheet 1.

J. K. HALLOCK & E. F. SPAULDING.
CUT-OFF VALVE GEAR.

No. 281,312. Patented July 17, 1883.

Witnesses:
W. R. Edelen.
Robt. H. Porter.

Inventors
E. F. Spaulding
Jno. K. Hallock (No Model.) 5 Sheets—Sheet 2.
J. K. HALLOCK & E. F. SPAULDING.
CUT-OFF VALVE GEAR.
No. 281,312. Patented July 17, 1883.
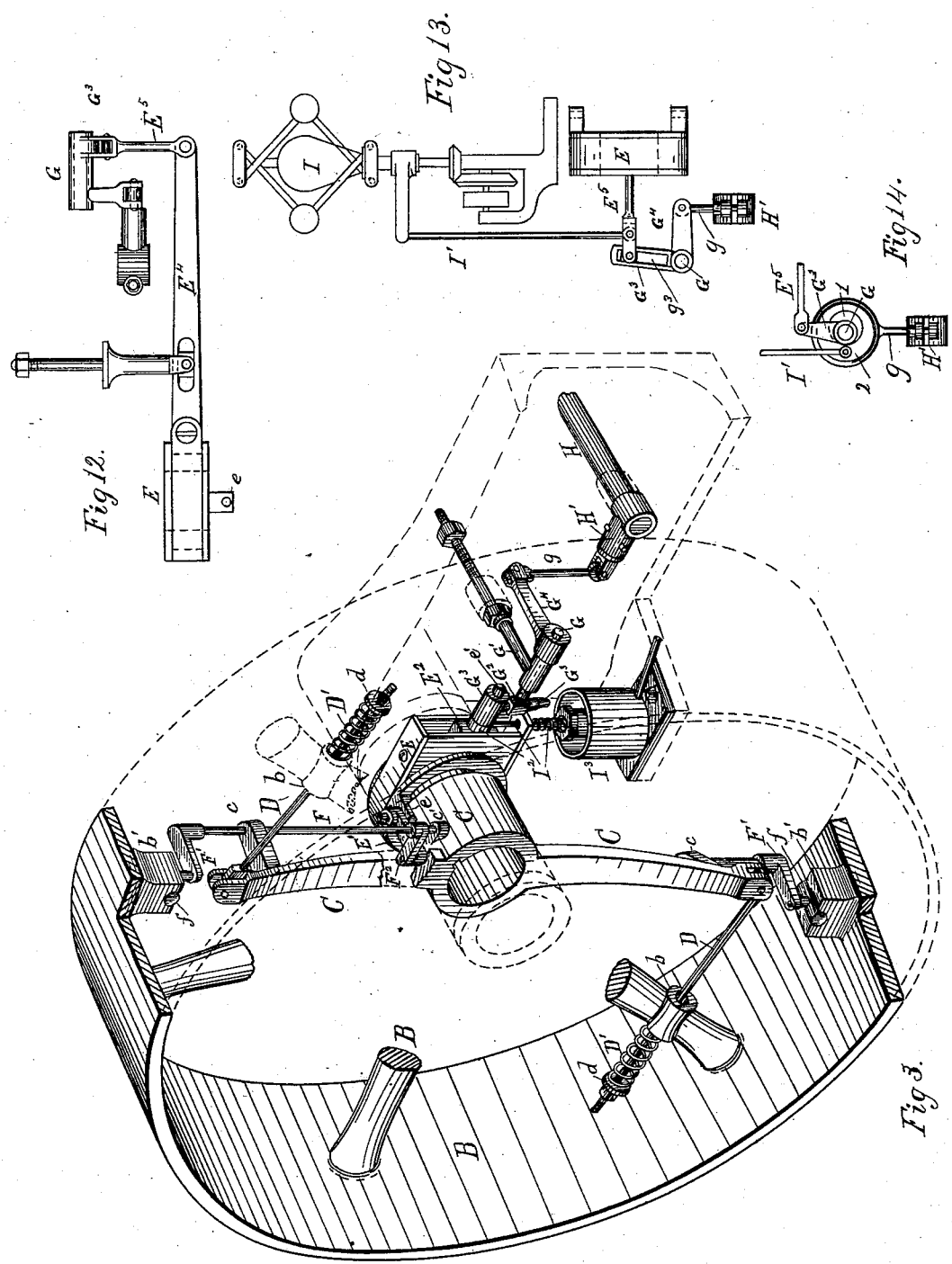
Witnesses:
H. R. Edden.
Robt. H. Porter.
Inventors,
E. F. Spaulding
Jno. K. Hallock

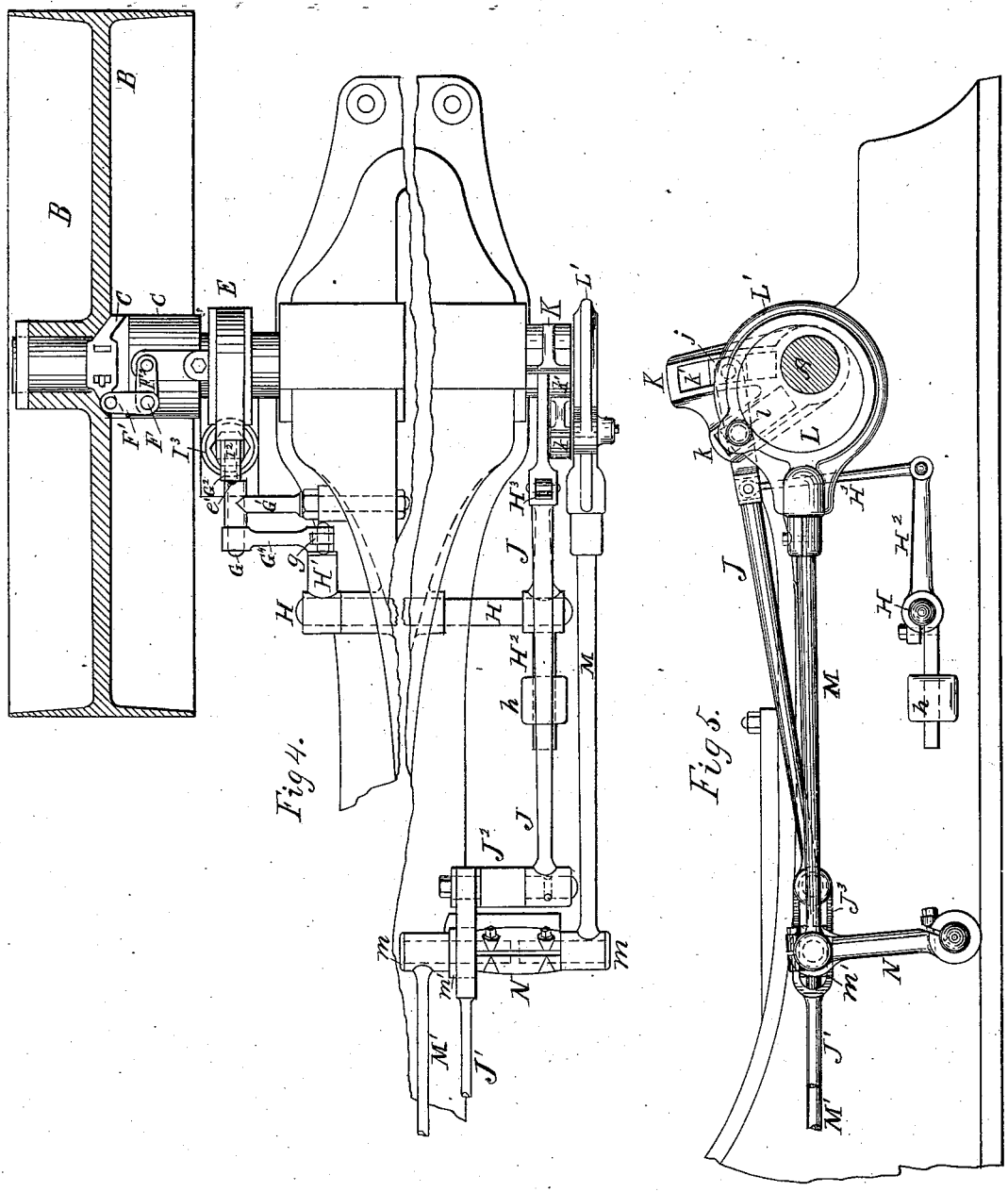

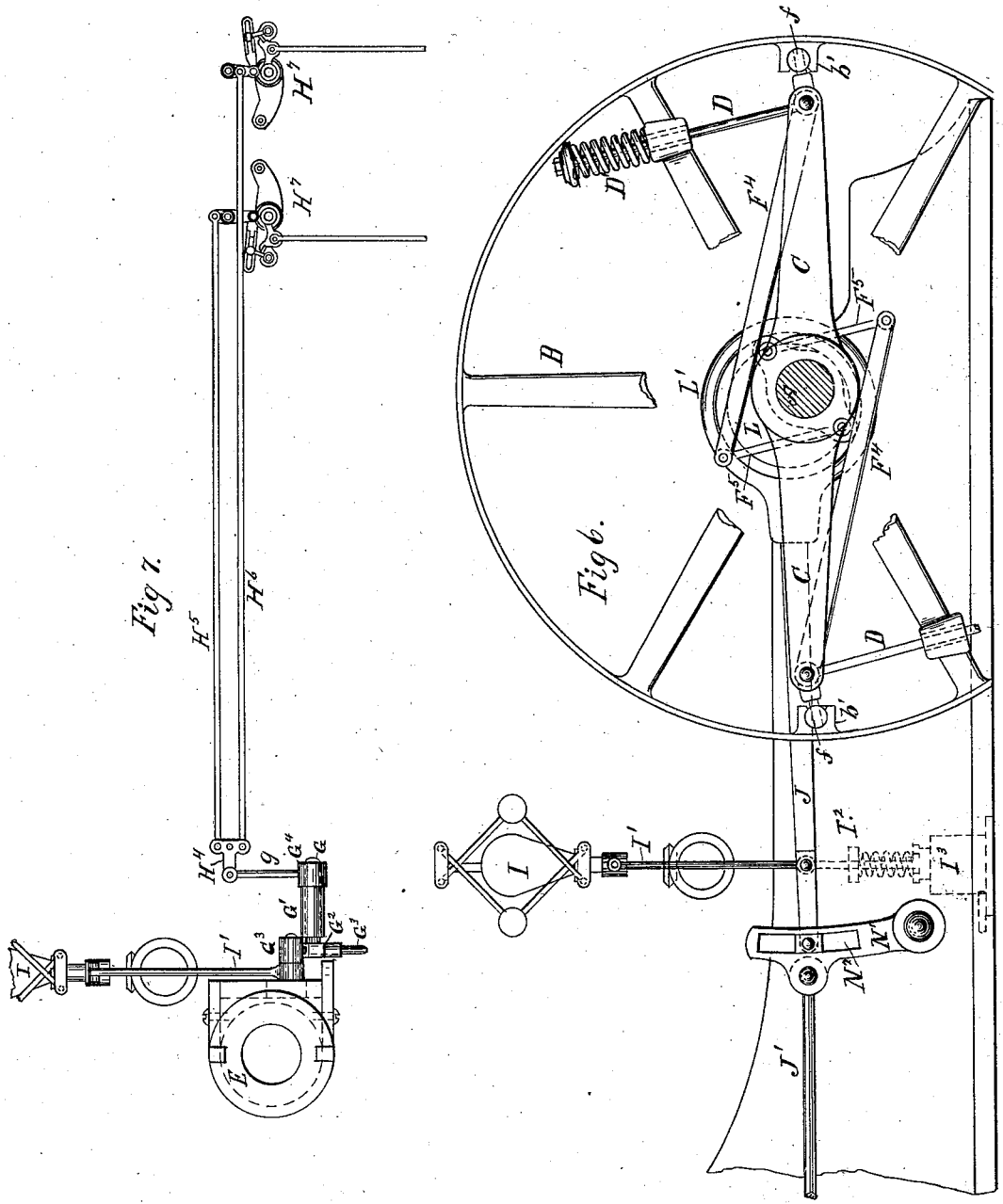

(No Model.) 5 Sheets—Sheet 5.
J. K. HALLOCK & E. F. SPAULDING.
CUT-OFF VALVE GEAR.
No. 281,312. Patented July 17, 1883.
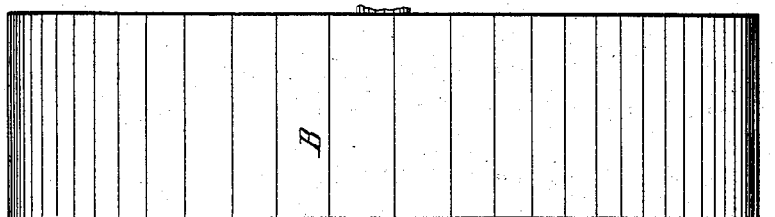
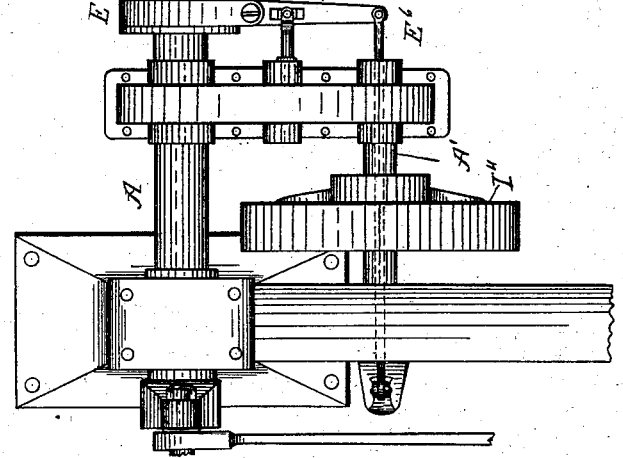
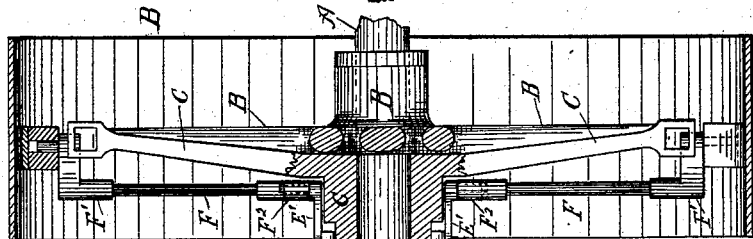
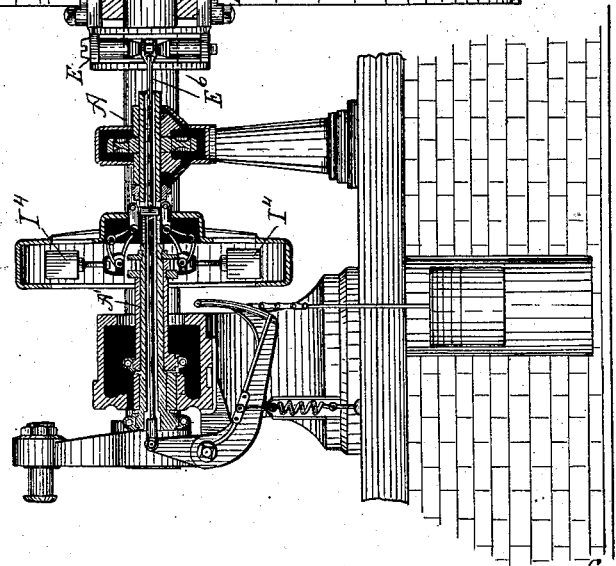
Witnesses,
W. R. Edelen.
Robt. H. Porter.
Inventors,
E. F. Spaulding
Jno. K. Hallock

UNITED STATES PATENT OFFICE.

JOHN K. HALLOCK AND ELIJAH F. SPAULDING, OF ERIE, PENNSYLVANIA, ASSIGNORS OF ONE-THIRD TO ELMER S. SMITH, OF SAME PLACE.

CUT-OFF-VALVE GEAR.

SPECIFICATION forming part of Letters Patent No. 281,312, dated July 17, 1883.

Application filed May 11, 1883. (No model.)

*To all whom it may concern:*

Be it known that we, JOHN K. HALLOCK and ELIJAH F. SPAULDING, citizens of the United States, residing at Erie, in the county of Erie and State of Pennsylvania, have invented certain new and useful Improvements in the Automatic Cut-Off-Valve Gear of Steam-Engines; and we do hereby declare the following to be a full, clear, and exact description of the invention, such as will enable others skilled in the art to which it appertains to make and use the same.

This invention consists in providing new and useful improvements in automatic variable cut-off-valve gears for steam-engines.

The object of the invention is to provide those types of variable cut-off-valve gears in which the regulator or governor is located and applied at some point off of the driving-shaft of the engine, with a dynamometrical regulator which is located on the driving-shaft in such a manner that the dynamometrical regulator shall coact with the other regulator in the government of the engine. There are two forces only to be considered in the government of a steam-engine, viz: the energy of the steam, which is called its "pressure," and is constantly varying; and, second, the resistance of the load being performed by the engine, which in most instances is constantly undergoing changes. If these two forces were always constant, there would be no necessity of a variable cut-off, or, at least, an automatically-variable cut-off. Where the government is effected solely by a centrifugal regulator or other regulator of that nature—such as a screw-wheel in fluid or a fan or a momentum wheel—the two forces named govern the engine through the medium of speed, and their action is ultimate and not direct. It has been attempted to govern an engine wholly by a dynamometrical regulator; but such a government is only a representation of the resistance of the load, and variations of steam-pressure are not taken notice of. Again, it has been attempted to govern an engine wholly by the pressure of the steam acting on a pressure-regulator; but such a government must be faulty, as it takes no notice of the variations of load. By reference to the patent to Elliot, March 27, 1855, it will be seen that it has been attempted to combine a dynamometrical governor with a speed-governor to regulate a throttle in the steam-supply pipe; but this device had no relation to an automatic cut-off-valve gear. By reference to the patent to Corliss, May 27, 1879, it will be seen that it has been attempted to govern a pumping-engine by a regulator which is affected by the pressure in the receiver or mains, thus registering the resistance of the load which the engine is performing, and by a speed-regulator, the two acting separately, as required by the conditions; but such a device can only be applied on engines which are pumping air or water. By reference to the patent to Ball, July 11, 1882, it will be seen that it has been attempted to govern an engine having a variable cut-off-valve gear by a dynamometrical and centrifugal governor combined on the shaft of the engine. In this device are the two forces applied to coact just as we apply them to coact, except that the means employed are different and the two forces only coact by opposing each other; and when we say they coact just as we apply them we mean that they act upon a variable cut-off-valve gear to automatically vary it; but as this device is confined wholly to the shaft of the engine, it is restricted to a shifting eccentric valve-gear, which greatly limits its usefulness, for there are many other forms or types of valve-gear which are desirable, and some which for some purposes are preferable to a shifting eccentric.

By our device any automatically-variable cut-off-valve gear may be coactively connected with a dynamometrical governor or regulator on the shaft. When the dynamometrical and centrifugal governors are both on the shaft, as in Ball's patent above referred to, it seems to be desirable, if not absolutely necessary, that the construction be such that the two oppose each other—that is, so that the load is carried by or against the centrifugal force of the balls or weights. When the dynamometrical regulator is on the shaft, and the other regulator, whatever its type may be, is off of the shaft, as we arrange the two, it is not necessary nor desirable that one regulator shall oppose the other, although they may be arranged to do so. The reason why it is not desirable for them to do so is that, if they did, the ingearing would have to be much stronger and would be cumbersome, and also much more liable to break and wear out. In the construction we here show, the two regulators act wholly independently the one of the other; but neither can move without moving the valve-gear; hence any change in one of the forces, however slight, will at once be felt by the valve-gear, while if one regulator had to overcome or change the other, as in Ball, above referred to, or if one was geared to act solely up to a certain point, and then the other solely after that point, as is the case in the patent to Corliss, above referred to, such delicacy of adjustment could not be obtained.

In the accompanying drawings we have shown several differing types of automatic variable cut-off-valve gears with our invention applied to them.

Figure 1:
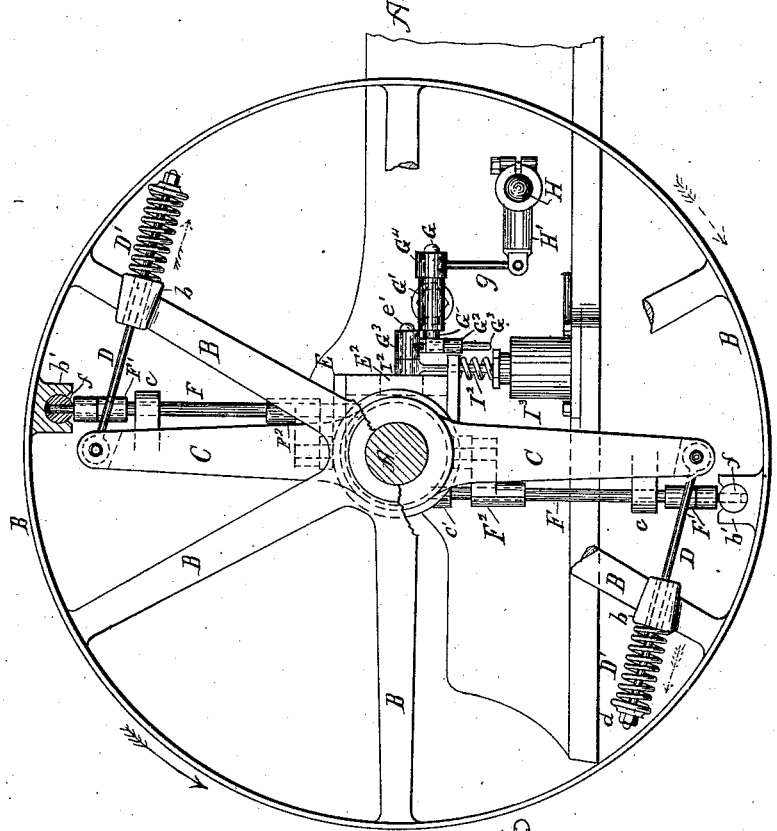
Figures 10, 11:
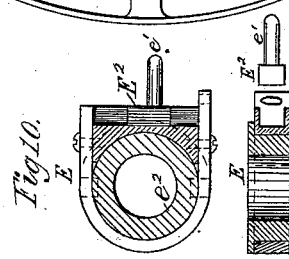

The accompanying drawings illustrate our invention, as follows:

Figure 1 is a side view of the drive-wheel, and shows the manner of constructing the dynamometrical regulator, and the connection of it with the other regulator off of the shaft of the engine, which in this figure is a steam-pressure regulator. Fig. 2 is a front elevation of the parts shown in Fig. 1, the drive-wheel being in section, and the regulator off of the shaft being a centrifugal or speed regulator of common type. Fig. 3 is a perspective view of the parts shown in Fig. 1, the drive-wheel being broken away. Fig. 4 is a plan view of the parts shown in Fig. 1, the drive-wheel being in section, and also of that portion of the valve-gear which is on the opposite side of the engine-bed, the bed being shown in fragments. Fig. 5 is a side elevation of that part of the valve-gear which is on the opposite side of the engine-bed from the parts shown in Fig. 1. Fig. 6 is a side elevation, and shows a different construction of the dynamometrical governor and a different type of valve-gear. Fig. 7 shows our invention applied to the style or type of valve-gear known as the "Corliss gear." Fig. 8 is a vertical transverse section of the type of valve-gear known as the "Cummer," with our invention applied thereto. Fig. 9 is a plan view of the parts shown in Fig. 8. Figs. 10, 11, 12, 13, and 14 show details of construction which will be referred to in detail herein.

In all the figures except Fig. 6 the dynamometrical regulator is constructed the same, and operates upon the other gearing by means of a sliding collar on the driving-shaft. In Fig. 6 the dynamometrical regulator is constructed so as to shift an eccentric on the shaft. The construction shown in this figure will form the subject of a separate application, and so, also, of the construction shown in Figs. 7, 8, and 9.

The construction and mode of operating or applying the steam-pressure regulator or other regulator so that the two may coact, and yet act independently, as here shown, is the invention of one of the present coinventors, and will form the subject of a separate application, although fully illustrated and described herein.

The dynamometrical regulator which is here shown in all the principal figures except Fig. 6 is constructed and operates as follows:

B is the drive-wheel of the engine, and is mounted loosely on the shaft A.

C is a cross-arm, which is fixed upon the said shaft. The two parts B and C are connected together flexibly by the rods D D and springs D' D', the said rods being connected with the arms C, and passing through bosses $b$ on two of the arms of the drive-wheel, and are secured by adjusting-nuts and washers $d$, and the springs D' D', which are interposed between the washers and the bosses. Full-line arrows show the direction of revolution of the shaft, and dotted-line arrows show the direction of resistance of the load, or, in other words, the direction of the strain of the belt. As the load increases, the springs D' D' are compressed, and the wheel and arm move apart. This movement is communicated to a sliding collar, E, on the shaft by bell-crank levers F F' F², F being the shaft, and F' F² the arms. These bell-cranks are pivoted onto the arms C in bosses $c'$ $c'$ in the hub, and lugs $c$ $c$, near the ends of the arms. The upper arms, F', are pivoted on the drive-wheel by having their pivots set in sliding pins $ff$, which are set in lugs $b'$ on the inside of the rim of the wheel. The lower arms, F², are pivoted to links E', which are in turn pivoted onto ears $e$, which extend from the collar-core $e^2$, and lie in recesses on the sides of the hub of the cross-arm C. By this device the collar E is moved on the shaft one way or the other, as the load on the engine is varied, and by the use of the bell-crank levers F F' F² the movement of the collar on the shaft may be as much in degree, or more, if desired, as the movement of the drive-wheel at its periphery, which is very advantageous, as there should be very little movement of the drive-wheel—say not to exceed an inch in all from no load to full load, and it is desirable that the collar should move about that distance. It will be obvious that by having the arms F² longer than F' the movement on the shaft will be greater than at the periphery of the wheel.

From the sliding collar the action of the dynamometrical governor is to be conveyed by gearing to the variable cut-off-valve gear. We have shown in the drawings several modifications of gears for doing this; but they all operate on substantially the same plan, which may be stated to be a rock-shaft or other pivoted lever having a variable fulcrum or a varying arm, or an arm adapted to permit the point at which the power is applied to be varied. This is also the case when the dynamometrical regulator acts through a shifting eccentric, as in Fig. 6. It is to this shifting arm or point of application of power or fulcrum that the other regulator is applied. In fact, both regulators are generally applied to it, while either may be. The object of this shifting lever is to enable each regulator to act on the gear at all times and always independently of the other. In Figs. 8 and 9 this is not shown to be used, and there the two regulators oppose each other. In Figs. 1, 2, 3, 4, and 7 the construction is substantially the same as to this gearing, and in Figs. 6, 12, 13, and 14 modifications are shown. The construction in Figs. 1, 2, 3, 4, and 7 is as follows: In a slot or way in the face of the strap of the sliding collar is a sliding block, $E^2$, from which extends a pin, $e'$. (See Figs. 11 and 12 for details.) On this pin $e'$ is connected the stem $I^2$ or $I'$ or connecting-rod of the other regulator, I or $I^3$, as the case may be, as shown variously in the drawings. To the pin $e'$ is also connected the shifting or variable arm $G^3$ of a rock-shaft, G, which is sustained in a horizontal position by a stud, $G'$, and has for its other arm the part $G^4$. The shifting arm $G^3$ is adapted to slide in a head, $G^2$, on the shaft or rod G, and is thus variable in length. The stud $G'$ is of such a length that it holds the rod or shaft G always at one side of the collar E, no matter what its position may be on the shaft; hence the arm $G^3$ is always at an angle to the slot in the face of the collar, (see Fig. 2,) and therefore the said arm cannot shift without rocking the shaft G. It will of course be seen that the collar cannot move without moving the shaft G. Now, the position of the block $E^2$, and so, or thereby, the arm $G^3$, as to its length, is varied by reason of its connection with the regulator I or $I^3$. Let us take it as in Fig. 2. Any change of speed will change the position of the weights of the governor I, and any change in their position will change the position of the block $E^2$ and will lengthen or shorten the arm $G^3$, and any change in its length will rock the shaft G on account of the angle at which it (the arm $G^3$) sets to the slot in the collar E, and the result is just the same when the regulator $I^3$ is used, when any change of steam-pressure occurs. So it will be seen that any change of speed (or steam-pressure, if the regulator $I^3$ is used) will rock the shaft G, and any change of load will shift the collar E, and that will rock the shaft G proportionately to the length of the arm $G^3$. It will also be seen that either of these regulators can change its position and the position of the rock-shaft G, and not interfere with or exert any appreciable power upon the other.

The movements of the rock-shaft G are communicated to the valve-gear proper from the arm $G^4$, and the connecting-rod $g$, and a rock-shaft, H $H'$ $H^2$, and rod $H^3$. In the construction shown in Fig. 7 the valve-gear is reached by a bell-crank, $H^4$, and rods $H^5$ $H^6$; and it will be obvious that the connecting-gearing will be varied in various types of engines to suit the requirements.

In Figs. 12 and 13, which are respectively a plan and an end view of the parts shown, a modification of the rocking lever with shifting load point or arm is shown. In this construction the rocking lever or rod G is removed some distance from the collar E, and a vibrating lever, $E^4$, is interposed, and motion is communicated to the arm $G^3$ by a rod, $E^5$, which connects with a sliding block in a slot, $g^3$, in the arm $G^3$, and the other regulator, I, is connected with this rod $E^5$, and moves it up or down in the slot $g^3$ as the conditions change. It will be seen that the arm $G^3$ is at an angle, so that any vertical movement of the rod $E^5$ will rock the shaft G. It will also be seen that any lateral vibration of the lever $E^4$ will move the shaft G, and that the degree of movement will depend on the position of the rod $E^5$ in the slot $g^3$. The arm $G^3$ is of variable length in result in this case, while in the former construction it is so in fact, and in each case the movement of the collar E will move the shaft G more or less, according as the other regulator shortens or lengthens the arm $G^3$. In the construction shown in Fig. 6 the same effect is had by different means somewhat. The varying or shifting arm $G^3$ is in effect a link movement, and in Fig. 6 we show it as such in fact in the valve-gear. Here we have a slotted rock-arm, N, which is in fact a link, and the eccentric-rod J is moved in the link by a governor, I, to vary the cut-off, and the vibrations of the link N are also varied by the dynamometrical governor on the shaft which shifts the eccentric. So here again we have each governor operating wholly independent of the other, and yet they coact at all points of cut-off, and one is a dynamometrical governor on the shaft, and the other may be any type of governor, and is off of the shaft.

The manner of constructing the dynamometrical governor here shown, or the means by which it shifts the eccentric, is of no consequence here, further than we may say that they may be greatly varied.

The application of the dynamometrical regulator to a wheel centrifugal regulator not on the driving-shaft is clearly shown in Figs. 8 and 9. The type of centrifugal regulator and variable cut-off-valve gear there shown is what is known as the "Cummer," and is made by the Cummer Engine Company, of Cleveland, Ohio. Here we apply the dynamometrical governor to the shifting collar E and the vibrating lever $E^4$, which latter takes hold of the counterbalance-rod $E^6$, and in effect adds to or takes from the counterbalance-weight, as the conditions of the load require. It will be observed that in this instance the two regulators do not act independently, but that the centrifugal action of the weights is opposed by the resistance of the load.

In Fig. 14 still another modification of the variable arm of the rock-shaft G is shown. Here the arm $G^3$, which is connected with the vibrating lever $E^4$, is not variable, but that which takes the place of arm G⁴ is. This consists of two eccentrics, 1 and 2, of which 1 is fixed on the shaft G, and the other, 2, is placed so as to contain the first, and is connected so as to be moved by the regulator that operates the rod I', and the connecting-rod *g* yokes over the eccentric 2. It will at once be seen that this device is simply another means of changing the length of one of the arms of the rock-shaft, or has the same effect, and that each regulator acts freely of the other, yet coacts with it at all points.

The operation of the combined regulator is substantially the same in all the figures here shown, except in Figs. 8 and 9, which differs, as before explained, and is as follows: Any change in the load of the engine will affect the position of the collar E, which, as it moves, rocks the shaft G, from which the variable parts of the variable valve-gear are moved; but this movement of the collar E will be the same always under like conditions of load, while the variation of cut-off must not be the same under all like conditions of load, for it must also be regulated with a view to the energy of the steam. So the variable arm of the shaft G is brought into the construction. When this arm is short, a given movement of the collar will rock the shaft G much farther than when the arm is long. So by the secondary governor, whether it is a speed-governor or a pressure-governor, changes in the energy of the steam are made to vary the length of this arm, as follows: High speed resulting from high pressure, or high pressure acting directly, will lengthen the said arm, and vice versa. So it will be seen that the action of like changes in load affect the movement of parts in varying degrees, as regulated from the steam conditions. This is absolutely essential where the two governors are geared to act independently of each other, and we consider it very desirable that they so act, unless it be in such a construction as is shown in Figs. 8 and 9; and where these regulators do so act independently they should act to affect the gear at all times. This is why the shaft G is set so that the arm G³ will always be at an angle to the plane of movement of the block E², as was above explained. In all the figures the same result is attained, so that in every instance neither regulator can act without moving the gearing. This prevents the steam-pressure changing under an even load without changing the cut-off, for, to refer to block E², it will be seen that at no point in the traverse of the collar E can this block move vertically without moving the shaft G, and in Fig. 13 the rod E⁵ cannot move vertically without moving the shaft G, and so of eccentric 2 in Fig. 14, and in Fig. 6 the rod J cannot be moved by the regulator I or I³ without affecting the cut-off.

We do not claim in this application two regulators operated from different forces, and connected together by gearing which is variable from the action of one or both regulators, and is moved by the action of either of said regulators, and is in operative connection with the variable cut-off-valve gear of said engine, so that the action of said gearing will automatically vary the cut-off-valve gear; nor regulators, one of which may act dynamometrically in such a combination; nor regulators one of which may act dynamometrically and the other by steam-pressure in such a combination. Nor do we claim a variable cut-off-valve gear which is acted upon to automatically vary the cut-off by two separate regulators which coact to perform said office, while each is free to act independently of the other, and one of which is mounted on the driving-shaft of the engine and acts dynamometrically, and the other mounted off of the shaft, and is operated to regulate the speed of the engine. Nor do we claim such a cut-off-valve gear, and regulators one of which acts dynamometrically and mounted on the driving-shaft, and the other by the direct action of the steam and mounted off of the shaft. Nor do we claim a dynamometrical regulator on the shaft of the engine, gearing adjusted off of said shaft and connected to be operated from said dynamometrical regulator, and a steam-pressure regulator mounted off of the shaft of the engine, and also connected with said gearing, so that the movement of said regulator will not only move said gearing, but also qualify its movements from the other regulator. Nor do we claim a dynamometrical regulator which shifts a collar on the engine-shaft, a rock-shaft or crank-shaft adjusted off of said engine-shaft, and having one of its arms variable, and connected by it to be operated from said sliding collar, a second regulator mounted off of said engine-shaft and adapted to vary the said variable arm of said crank-shaft, and finally means for moving the variable cut-off-valve gear of said engine from the rock-shaft. Nor do we claim a cut-off-valve rod, a pivoted link rocked by the action of the eccentric, in which link the said rod is movable for the purpose of varying the cut-off of the valve, and gearing for varying the position of said rod in said link, which is actuated from a dynamometrical regulator on the shaft of the engine, and a second regulator which is adjusted off of the shaft of the engine, which two regulators act independently of each other upon said gearing, while one qualifies the effect of the action of the other. Nor do we claim the combination of an eccentric strap and pin, and a link pivoted to the engine-shaft and operated from said pin, which works in a slot. Nor do we claim the combination of a rock-arm which is moved by the exhaust-valve rod, a pivoted guide-block, and a jointed cut-off-valve rod embracing said guide-block. Nor do we claim the combination of a cut-off-valve rod, a link pivoted on the engine-shaft and rocked from the eccentric strap, and gearing for varying the position of said rod in said link from the action of the governing device in said valve-gear.

Nor do we claim an automatic variable valve-gear for regulating the cut-off, which consists of a shifting eccentric on the shaft, which is operated upon by a dynamometrical regulator, and a link movement off of the shaft, which is operated upon to vary the cut-off by a second regulator mounted off of the shaft. Nor do we claim, in a steam-engine having independent cut-off valves at each end of the cylinder, the combination, in the valve-gear for automatically varying the movement of said valves to vary the cut-off, of two separate regulators acted upon by different forces, each of which coacts with the other in the performance of said office, and one of which is a dynamometrical regulator and is mounted on the engine-shaft, as such devices form the subjects-matter of separate applications filed on the same day as this application.

What we claim as new is—

1. In a steam-engine, the combination, substantially as shown, of a dynamometrical regulator on the shaft of the engine, and some other type of regulator off of the shaft, said regulators being geared together to coact, substantially as shown, in the automatic regulation of the variable cut-off-valve gear of said engine.

2. In a steam-engine, the combination, substantially as shown, of a variable cut-off-valve gear which is acted upon to automatically vary the cut-off by two separate regulators, one of which is mounted on the shaft of the engine and acts dynamometrically to regulate from the changes in the load, and the other is mounted off of the shaft of the engine, and is operated, substantially as shown, to regulate the speed of the engine.

3. In a steam-engine, the combination of a dynamometrical regulator on the shaft of the engine, a rocking or pivoted part adjusted off of the shaft of the engine, and adapted, substantially as shown, to be actuated from said dynamometrical regulator, a second regulator adjusted off of said engine-shaft, and in operative connection with said rocking part in a manner substantially as shown, whereby both of said regulators shall be in coactive connection, and finally a cut-off valve for operating said engine, which is automatically varied in its action from movements of both said connected regulators.

4. In a steam-engine, the combination of a dynamometrical regulator which moves a shifting collar on the engine-shaft, a rock-shaft or crank-shaft adjusted off of said engine-shaft, and connected, substantially as shown, to be operated from said sliding collar, and finally means, substantially as shown, for moving the variable parts of the variable cut-off-valve gear of said engine from said rock-shaft.

5. In a steam-engine valve-gear a dynamometrical regulator consisting of a drive-wheel loose upon the shaft and flexibly connected with a fixed cross-arm on the shaft, which cross-arm is provided with radially-arranged rocking shafts whose outer arms are pivotally connected with the said drive-wheel, and whose inner arms act to shift a collar on the engine-shaft, substantially as shown.

In testimony whereof we affix our signatures in presence of two witnesses.

JNO. K. HALLOCK.
ELIJAH F. SPAULDING.

Witnesses:
ROBT. H. PORTER,
JACOB F. WALTHER.